United States Patent
Fukao et al.

(10) Patent No.: US 9,637,195 B2
(45) Date of Patent: May 2, 2017

(54) BICYCLE OPERATING DEVICE

(71) Applicant: SHIMANO INC., Sakai (JP)

(72) Inventors: Kazutaka Fukao, Sakai (JP); Yasuhisa Watanabe, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/249,300

(22) Filed: Apr. 9, 2014

(65) Prior Publication Data

US 2015/0291249 A1    Oct. 15, 2015

(51) Int. Cl.
*F16C 1/00* (2006.01)
*B62K 23/06* (2006.01)
*B62K 23/02* (2006.01)

(52) U.S. Cl.
CPC ............. *B62K 23/06* (2013.01); *B62K 23/02* (2013.01)

(58) Field of Classification Search
CPC ... B62M 25/04; B62L 3/02; B62J 1/08; B62K 23/02; B62K 19/36
See application file for complete search history.

(56) References Cited

U.S. PATENT DOCUMENTS

| | | | |
|---|---|---|---|
| 3,181,391 A | 5/1965 | Juy | |
| 3,861,740 A * | 1/1975 | Tajima et al. | 297/215.13 |
| 4,807,856 A * | 2/1989 | Teckenbrock | 267/132 |
| 4,872,696 A * | 10/1989 | Gill | 280/281.1 |
| 5,007,675 A * | 4/1991 | Musto et al. | 297/215.14 |
| 5,149,034 A * | 9/1992 | Ganaja | 248/178.1 |
| 5,829,733 A * | 11/1998 | Becker | 248/631 |
| 6,161,448 A * | 12/2000 | Wang | 74/502.2 |
| 7,422,224 B2 * | 9/2008 | Sicz et al. | 280/274 |
| 7,806,022 B2 * | 10/2010 | Hara | 74/502.2 |
| 8,065,932 B2 * | 11/2011 | Hara et al. | 74/502.2 |
| 8,246,065 B1 * | 8/2012 | Kodama et al. | 280/287 |
| 8,550,551 B2 * | 10/2013 | Shirai | 297/215.13 |
| 2008/0098848 A1 | 5/2008 | Dal Pra' et al. | |
| 2009/0158881 A1 | 6/2009 | Shahana | |
| 2011/0204201 A1 * | 8/2011 | Kodama et al. | 248/406.1 |
| 2012/0253606 A1 | 10/2012 | Takamoto et al. | |
| 2014/0137696 A1 | 5/2014 | Kosaka et al. | |
| 2015/0009019 A1 | 1/2015 | Watarai et al. | |
| 2015/0073656 A1 | 3/2015 | Takamoto et al. | |

OTHER PUBLICATIONS

Office Action with Form PTO-892 Notice of References Cited issued by the U.S. Patent and Trademark Office for the child U.S. Appl. No. 14/608,104, filed Dec. 18, 2015.
Office Action issued by the U.S. Patent and Trademark Office for the continuation U.S. Appl. No. 14/608,104, Dec. 19, 2016.

* cited by examiner

*Primary Examiner* — Vicky Johnson
(74) *Attorney, Agent, or Firm* — Mori & Ward, LLP

(57) ABSTRACT

A bicycle operating device comprises a base member, a first movable member, an operating structure, and a changing structure. The base member is configured to be mounted to a bicycle part. The first movable member is movable relative to the base member. The operating structure is configured to operate a bicycle component in response to movement of the first movable member. The changing structure includes a second movable member configured to be movable relative to the first movable member. The changing structure is configured to change an amount of movement of the first movable member relative to the base member in accordance with movement of the second movable member relative to the first movable member.

25 Claims, 9 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, a first movable member, an operating structure, and a changing structure. The base member is configured to be mounted to a bicycle part. The first movable member is movable relative to the base member. The operating structure is configured to operate a bicycle component in response to movement of the first movable member. The changing structure includes a second movable member configured to be movable relative to the first movable member. The changing structure is configured to change an amount of movement of the first movable member relative to the base member in accordance with movement of the second movable member relative to the first movable member.

In accordance with a second aspect of the present invention, the bicycle operating device according to the first aspect is configured so that the operating structure is configured to operate the bicycle component by moving an operation cable relative to the base member in response to movement of the first movable member.

In accordance with a third aspect of the present invention, the bicycle operating device according to the first aspect is configured so that the second movable member is movable between a first position and a second position. The first position corresponds to a first amount of movement of the first movable member relative to the base member. The second position corresponds to a second amount of movement of the first movable member relative to the base member. The second amount of movement is different from the first amount of movement.

In accordance with a fourth aspect of the present invention, the bicycle operating device according to the first aspect is configured so that the second movable member is mounted to the first movable member.

In accordance with a fifth aspect of the present invention, the bicycle operating device according to the fourth aspect is configured so that the second movable member is slidable relative to the first movable member.

In accordance with a sixth aspect of the present invention, the bicycle operating device according to the second aspect is configured so that the operating structure is configured to pull the operation cable by a first amount of cable stroke in a state where the first movable member is moved relative to the base member by a first amount of movement. The operating structure is configured to pull the operation cable by a second amount of cable stroke in a state where the first movable member is moved relative to the base member by a second amount of movement. The second amount of movement is different from the first amount of movement. The first amount of cable stroke is different from the second amount of cable stroke.

In accordance with a seventh aspect of the present invention, the bicycle operating device according to the sixth aspect is configured so that the first amount of movement of the first movable member is greater than the second amount of movement of the first movable member. The first amount of cable stroke is greater than the second amount of cable stroke.

In accordance with an eighth aspect of the present invention, the bicycle operating device according to the third aspect is configured so that the changing structure further includes a biasing element configured to bias the second movable member to the first position relative to the first movable member.

In accordance with a ninth aspect of the present invention, the bicycle operating device according to the first aspect is configured so that the first movable member is movable relative to the base member in a first direction. The second movable member is movable relative to the first movable member in a second direction different from the first direction.

In accordance with a tenth aspect of the present invention, the bicycle operating device according to the ninth aspect is configured so that the first movable member is pivotably mounted to the base member in the first direction about a pivot axis.

In accordance with an eleventh aspect of the present invention, the bicycle operating device according to the ninth aspect is configured so that the second movable member is movable relative to the base member in the first direction together with the first movable member.

In accordance with a twelfth aspect of the present invention, the bicycle operating device according to the tenth aspect is configured so that the first movable member has a longitudinal axis radially outwardly extending with respect to the pivot axis. The second movable member is movable relative to the first movable member along the longitudinal axis of the first movable member.

In accordance with a thirteenth aspect of the present invention, the bicycle operating device according to the twelfth aspect is configured so that the changing structure further includes a biasing element configured to radially outwardly bias the second movable member relative to the first movable member.

In accordance with a fourteenth aspect of the present invention, the bicycle operating device according to the thirteenth aspect is configured so that the first movable member includes one of a contact part and an elongated hole. The second movable member includes another of the contact part and the elongated hole. The contact part is provided in the elongated hole so as to restrict relative movement between the first movable member and the second movable member.

In accordance with a fifteenth aspect of the present invention, the bicycle operating device according to the third aspect is configured so that the changing structure further includes a first contact portion and a second contact portion. The second contact portion is provided on one of the first movable member and the second movable member and is contactable with the first contact portion to restrict an amount of movement of the first movable member relative to the base member when the second movable member is positioned at the second position.

In accordance with a sixteenth aspect of the present invention, the bicycle operating device according to the fifteenth aspect is configured so that each of the first contact portion and the second contact portion is made of a metallic material.

In accordance with a seventeenth aspect of the present invention, the bicycle operating device according to the fifteenth aspect is configured so that the first contact portion protrudes from the base member to be contactable with the second contact portion.

In accordance with an eighteenth aspect of the present invention, the bicycle operating device according to the first aspect further comprises a mounting member configured to detachably couple the base member to the bicycle part. The first movable member extends along a longitudinal axis of the bicycle part in a state where the first movable member is positioned at a rest position and in a state where the base member is mounted to the bicycle part via the mounting member.

In accordance with a nineteenth aspect of the present invention, the bicycle operating device according to the eighteenth aspect is configured so that the bicycle part comprises a bicycle handlebar extending along the longitudinal axis. The bicycle handlebar includes a first handlebar end and a second handlebar end opposite to the first handlebar end. The changing structure further includes a biasing element configured to bias the second movable member toward the first handlebar end of the bicycle handlebar relative to the first movable member in a state where the base member is mounted to the bicycle handlebar via the mounting member at a position closer to the first handlebar end than to the second handlebar end.

In accordance with a twentieth aspect of the present invention, the bicycle operating device according to the first aspect is configured so that changing an amount of movement of the first movable member by the changing structure results in differently operating the bicycle component in comparison with a state before changing the amount of movement of the first movable member by the changing structure.

In accordance with a twenty-first aspect of the present invention, the bicycle operating device according to the third aspect is configured so that the bicycle operating device differently operates the bicycle component when the first movable member moves by the second amount of movement in comparison with when the first movable member moves by the first amount of movement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
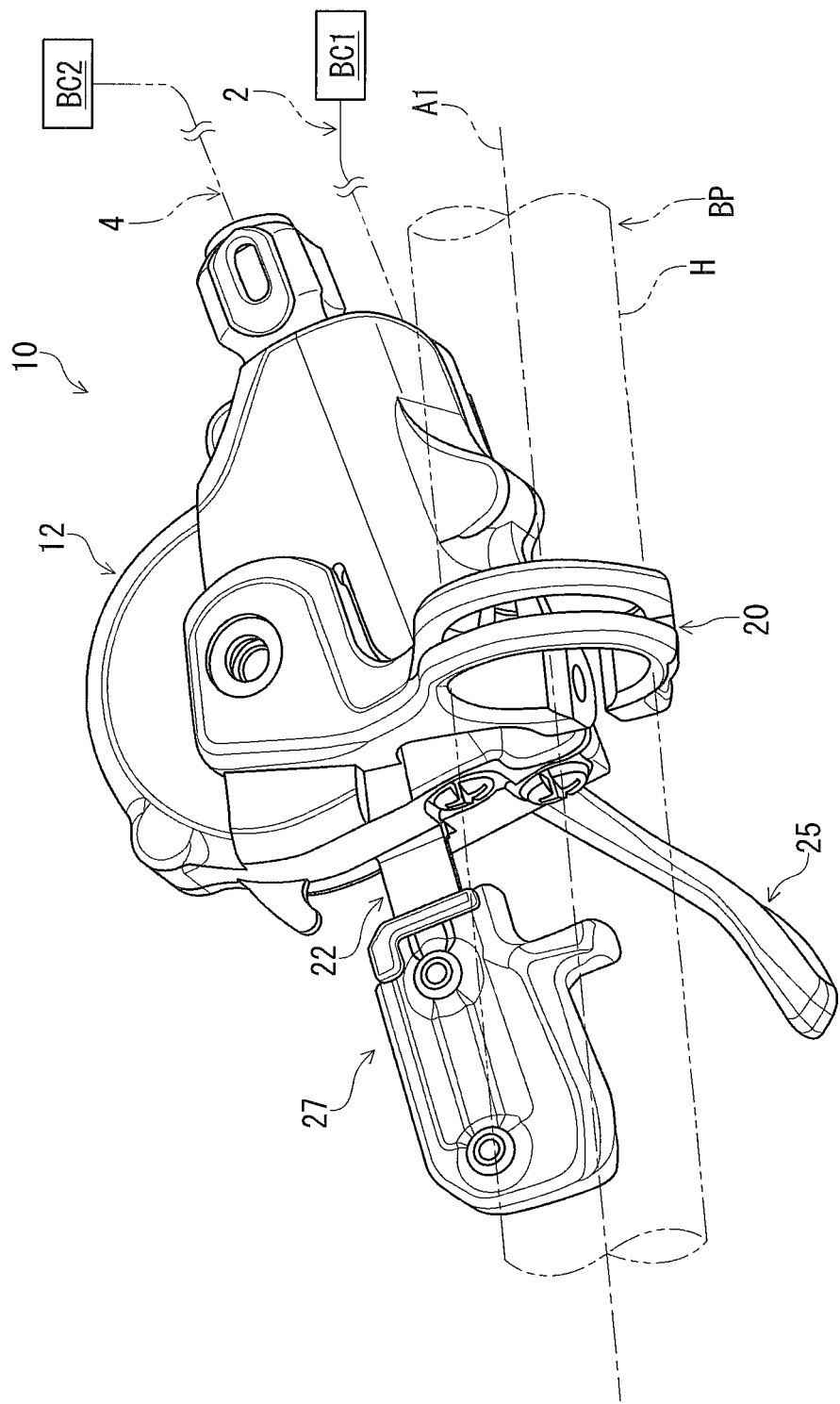
FIG. 1 is a perspective view of a bicycle operating device in accordance with an embodiment.

The embodiments will now be described with reference to the accompanying drawings, wherein like reference numerals designate corresponding or identical elements throughout the various drawings.

Referring initially to FIG. 1, a bicycle operating device 10 in accordance with an embodiment is configured to be attached to a bicycle part BP for operating a bicycle component BC1. Possible examples of the bicycle part BP include a bicycle tube part such as a bicycle handlebar and a bicycle frame. In the illustrated embodiment, the bicycle part BP comprises a bicycle handlebar H extending along a longitudinal axis A1.

The bicycle operating device 10 is configured to operate the bicycle component BC1 via an operation cable 2. The bicycle operating device 10 is further configured to operate a bicycle component BC2 via an operation cable 4. In the illustrated embodiment, the operation cables 2 and 4 are a mechanical cable such as a Bowden cable. The bicycle operating device 10 can, however, be configured to operate at least one of the bicycle components BC1 and BC2 using structures other than an operation cable. For example, the bicycle operating device 10 can be configured to operate at least one of the bicycle components BC1 and BC2 using a hydraulic operating structure.

Possible examples of each of the bicycle components BC1 and BC2 include a bicycle transmission and a height adjustable seatpost assembly. In the illustrated embodiment, the bicycle component BC1 is the height adjustable seatpost assembly. The bicycle component BC2 is the bicycle transmission such as a front derailleur, a rear derailleur, and an internal hub transmission. Since such bicycle components are well known in the bicycle field, they will not be described and/or illustrated in detail here for the sake of brevity.

Figure 2:
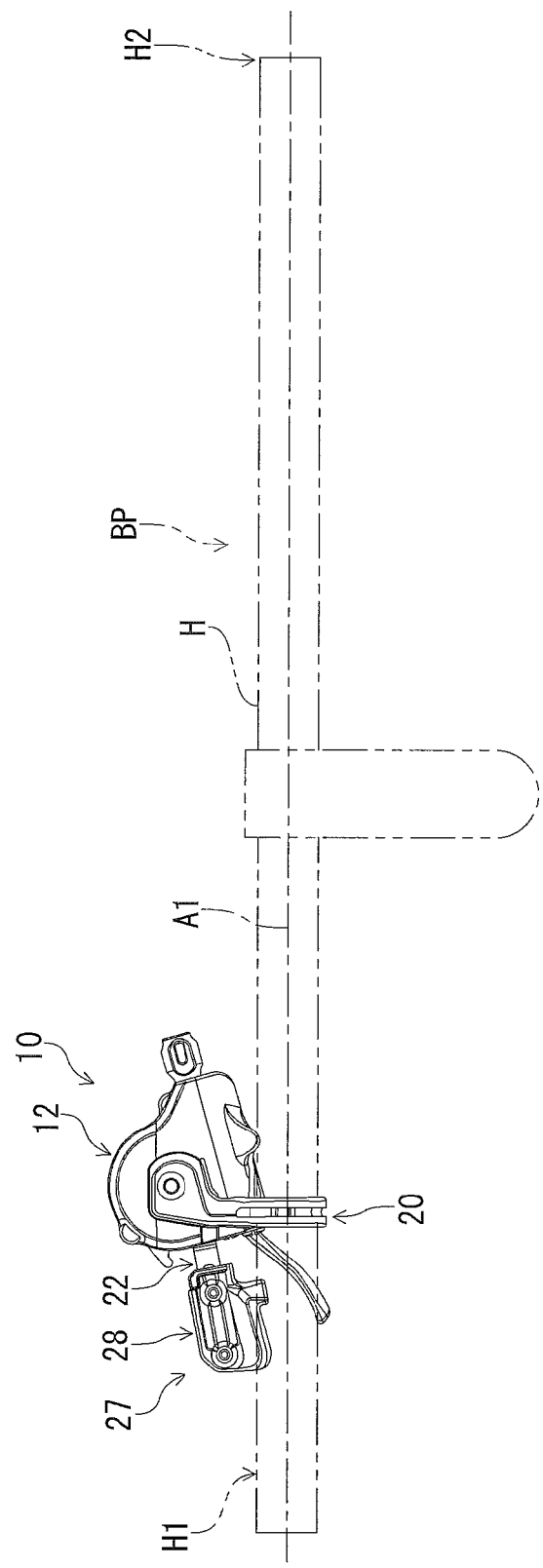
FIG. 2 is a plan view of a bicycle part to which the bicycle operating device illustrated in FIG. 1 is mounted.

As seen in FIG. 2, the bicycle handlebar H includes a first handlebar end H1 and a second handlebar end H2 opposite to the first handlebar end H1, for example. In the illustrated embodiment, the first handlebar end H1 is a left end of the bicycle handlebar H, and the second handlebar end H2 is a right end of the bicycle handlebar H. The bicycle operating device 10 is mounted to a left part of the bicycle handlebar H. The bicycle operating device 10 is a left bicycle operating device configured to be operated with a rider's left hand. However, it will be apparent to those skilled in the bicycle field from the present disclosure that the configuration of the bicycle operating device 10 can be applied to a right bicycle operating device.

In the present application, the following directional terms "forward", "rearward", "left", "right", "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to a bicycle equipped with the bicycle operating device 10 as used in an upright riding position on a horizontal surface.

Figure 3:
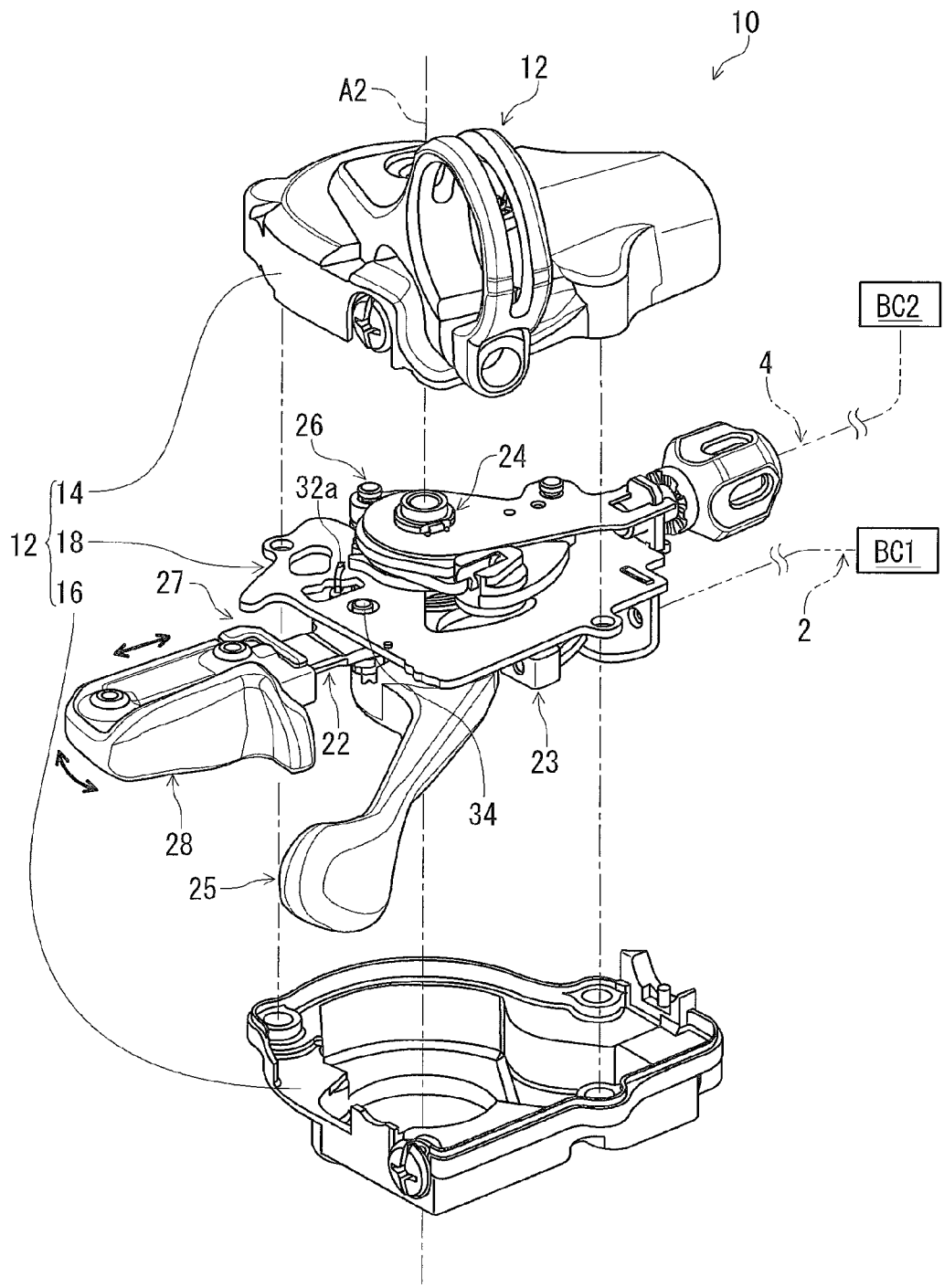
FIG. 3 is an exploded perspective view of the bicycle operating device illustrated in FIG. 1.

As seen in FIG. 1, the bicycle operating device 10 comprises a base member 12. The base member 12 is configured to be mounted to the bicycle part BP. In the illustrated embodiment, as seen in FIG. 3, the base member 12 includes a first housing 14 and a second housing 16. The first housing 14 is secured to the second housing 16 using screws (not shown). The base member 12 further includes a base plate 18 secured to the first housing 14 and the second housing 16. The base plate 18 is provided between the first housing 14 and the second housing 16.

The bicycle operating device 10 further comprises a mounting member 20 configured to detachably couple the base member 12 to the bicycle part BP. In the illustrated embodiment, the mounting member 20 has a clamping structure configured to clamp the bicycle part BP. The mounting member 20 is secured to the base member 12. The mounting member 20 can be integrally provided with the base member 12 (e.g., the first housing 14 illustrated in FIG. 3) as a single unitary member.

As seen in FIG. 3, the bicycle operating device 10 comprises a first movable member 22 and an operating structure 23. The first movable member 22 is movable relative to the base member 12. The operating structure 23 is configured to operate the bicycle component BC1 in response to movement of the first movable member 22. The operating structure 23 is configured to operate the bicycle component BC1 by moving the operation cable 2 relative to the base member 12 in response to movement of the first movable member 22.

In the illustrated embodiment, the first movable member 22 is movably mounted to the base plate 18. The first movable member 22 is rotatably supported by a support shaft 24 secured to the base member 12. The first movable member 22 at least partially protrudes from the base member 12. The operating structure 23 is provided between the first housing 14 and the second housing 16.

As seen in FIG. 3, the bicycle operating device 10 comprises an additional operating lever 25 and an additional operating structure 26. The additional operating lever 25 is pivotable relative to the base member 12 about the pivot axis A2. The additional operating structure 26 is configured to operate the bicycle component BC2 via the operation cable 4 in response to pivotal movement of the additional operating lever 25. Since the additional operating lever 25 and the additional operating structure 26 include well known structures, they will not be described and/or illustrated in detail here for the sake of brevity.

As seen in FIG. 3, the bicycle operating device 10 comprises a changing structure 27. The changing structure 27 includes a second movable member 28 configured to be movable relative to the first movable member 22. The changing structure 27 is configured to change an amount of movement of the first movable member 22 relative to the base member 12 in accordance with movement of the second movable member 28 relative to the first movable member 22. In the illustrated embodiment, the second movable member 28 is mounted to the first movable member 22. Possible examples of movement of the second movable member 28 with respect to the first movable member 22 include relative linear movement, relative rotation, and relative pivotal movement.

Figure 4:
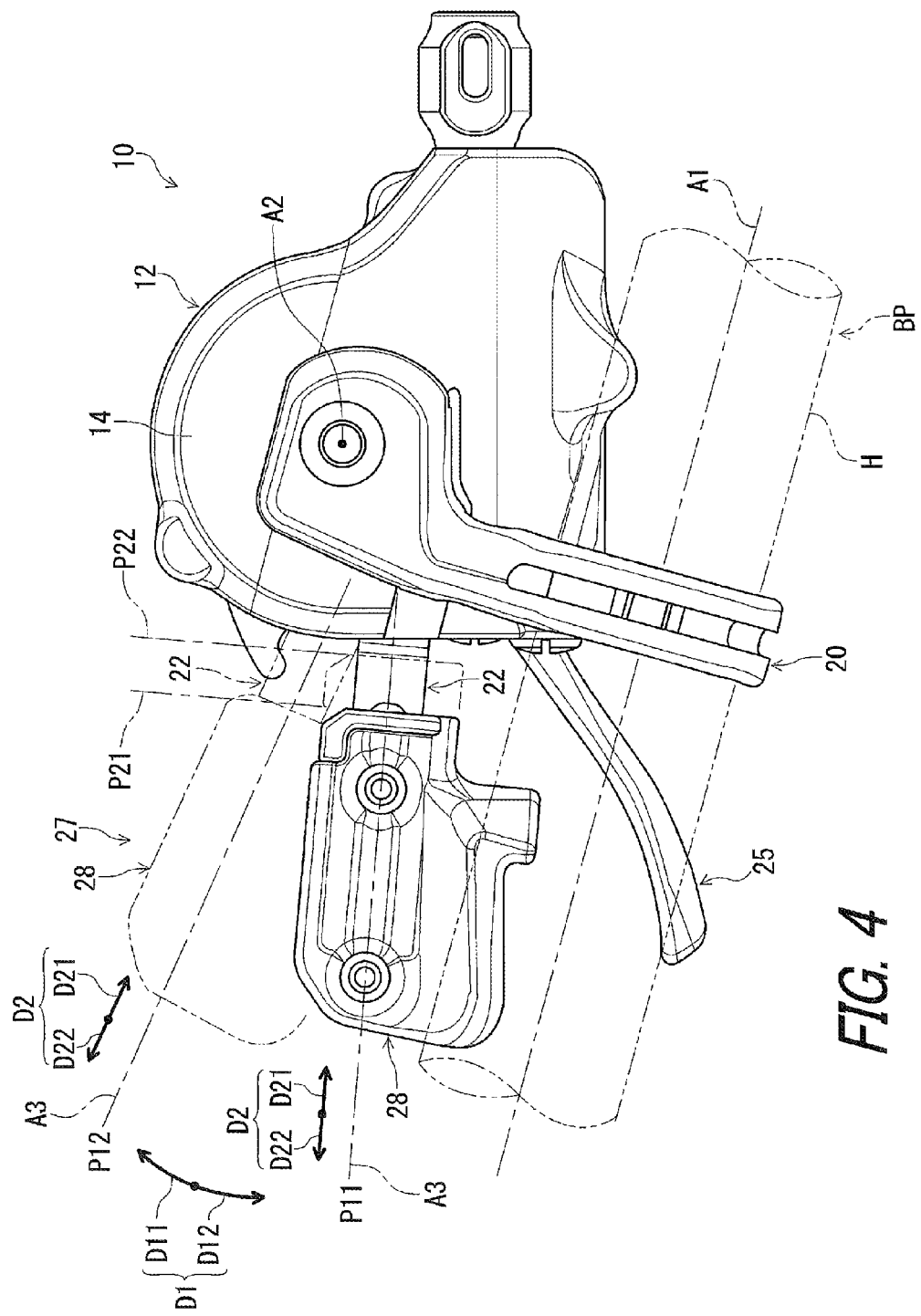
FIG. 4 is a plan view of the bicycle operating device illustrated in FIG. 1.

As seen in FIG. 4, the first movable member 22 is movable relative to the base member 12 in a first direction D1. In the illustrated embodiment, the first movable member 22 is pivotably mounted to the base member 12 in the first direction D1 about a pivot axis A2. The first direction D1 includes a first operating direction D11 and a first return direction D12 opposite to the first operating direction D11. The pivot axis A2 extends in a direction perpendicular to the longitudinal axis A1 in a state where the base member 12 is attached to the bicycle part BP.

The first movable member 22 is movable relative to the base member 12 between a rest position P11 and an operated position P12. More specifically, the first movable member 22 is pivotable relative to the base member 12 about the pivot axis A2 between the rest position P11 and the operated position P12. The first movable member 22 extends along the longitudinal axis A1 of the bicycle part BP in a state where the first movable member 22 is positioned at the rest position P11 and in a state where the base member 12 is mounted to the bicycle part BP via the mounting member 20.

The first movable member 22 has a longitudinal axis A3 radially outwardly extending with respect to the pivot axis A2. In the illustrated embodiment, the longitudinal axis A3 of the first movable member 22 is inclined with respect to the longitudinal axis A1 of the bicycle part BP in a state where the first movable member 22 is positioned at the rest position P11 and in a state where the base member 12 is mounted to the bicycle part BP via the mounting member 20. The longitudinal axis A3 of the first movable member 22 can, however, be parallel to the longitudinal axis A1 of the bicycle part BP in a state where the first movable member 22 is positioned at the rest position P11 and in a state where the base member 12 is mounted to the bicycle part BP via the mounting member 20. The rest position P11 and the operated position P12 are defined based on the longitudinal axis A3 of the first movable member 22.

In the present application, the term "rest position" as used herein refers to a position at which a movable part such as the first movable member 22 remains stationary in a state where the movable part is not operated by the user. The term "operated position" as used herein refers to a position at which the movable part has been operated by the user to perform the operation of the bicycle component BC1.

As seen in FIG. 4, the second movable member 28 is movable between a first position P21 and a second position P22. The first position P21 is farther from the base member 12 than the second position P22. In the illustrated embodiment, the second movable member 28 is slidable relative to the first movable member 22. The second movable member 28 is slidable relative to the first movable member 22 between the first position P21 and the second position P22.

The second movable member 28 is movable relative to the first movable member 22 in a second direction D2 different from the first direction D1. The second movable member 28 is also movable relative to the base member 12 in the first direction D1 together with the first movable member 22. The second movable member 28 is movable relative to the first movable member 22 along the longitudinal axis A3 of the first movable member 22. The second direction D2 is defined parallel to the longitudinal axis A3 of the first movable member 22. The second direction D2 includes a second operating direction D21 and a second return direction D22 opposite to the second operating direction D21. The second movable member 28 is movable relative to the first movable member 22 in the second operating direction D21 and the second return direction D22.

Figure 5:
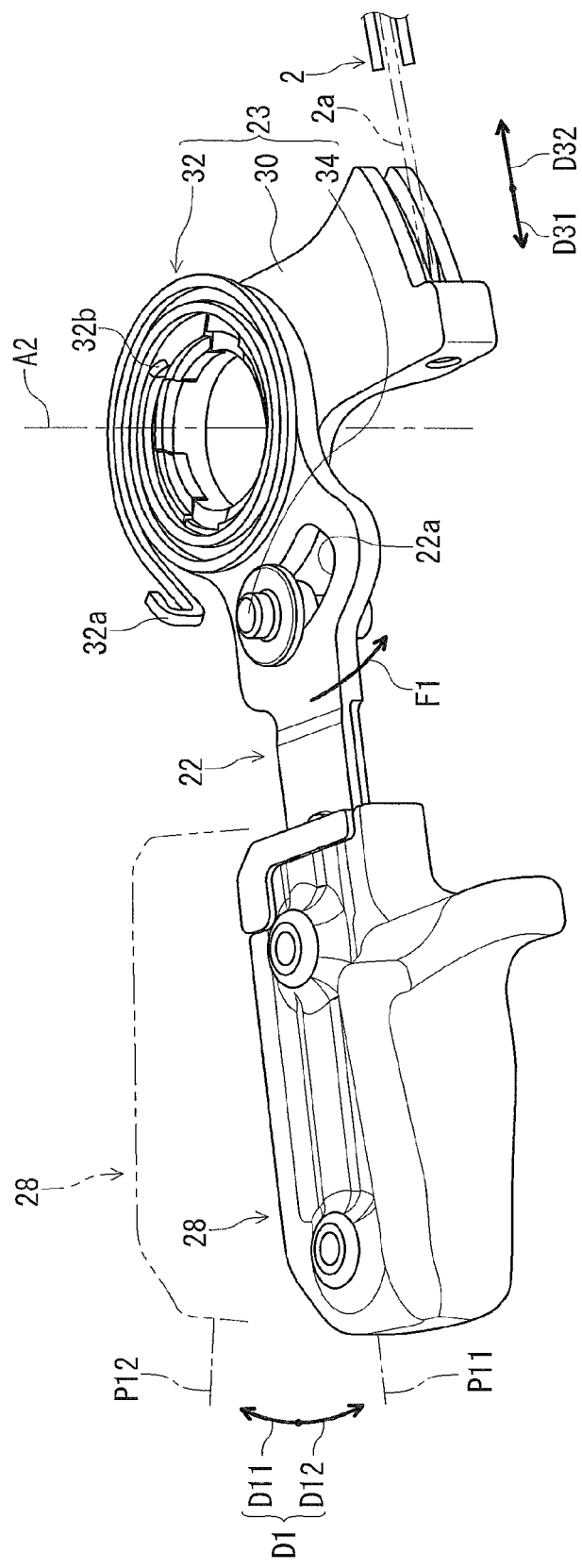
FIG. 5 is a perspective view of a part of the bicycle operating device illustrated in FIG. 1.

As seen in FIG. 5, the operating structure 23 includes a cable attachment member 30 and a biasing member 32. The cable attachment member 30 is attached to the first movable member 22 and is integrally rotatable with the first movable member 22 about the pivot axis A2. An end of the operation cable 2 is attached to the cable attachment member 30. More specifically, an end of an inner wire 2a of the operation cable 2 is attached to the cable attachment member 30. In the illustrated embodiment, the cable attachment member 30 is a separate member from the first movable member 22. The cable attachment member 30 can, however, be integrally provided with the first movable member 22 as a single unitary member.

The biasing member 32 is configured to bias the first movable member 22 in the first return direction D12. In other words, the biasing member 32 is configured to bias the first movable member 22 such that the first movable member 22 is positioned to the rest position P11. More specifically, the biasing member 32 is configured to bias the first movable member 22 to pivot relative to the base member 12 (FIG. 4) about the pivot axis A2. In the illustrated embodiment, the biasing member 32 is a torsion coil spring provided around the pivot axis A2. The biasing member 32 can, however, be other springs such as a compression spring and a tension spring.

The biasing member 32 includes a first end 32a and a second end 32b. The first end 32a of the biasing member 32 engages with the base plate 18 of the base member 12 (FIG. 3). The second end 32b of the biasing member 32 engages with the first movable member 22. The biasing member 32 is configured to apply a biasing force F1 to the first movable member 22 in the first return direction D12.

As seen in FIG. 5, when the first movable member 22 is pivoted about the pivot axis A2 in the first operating direction D11, the operation cable 2 is pulled via the cable attachment member 30 in a first cable-operating direction D31. When the first movable member 22 is returned about the pivot axis A2 in the first return direction D12, the operation cable 2 is released via the cable attachment member 30 in a second cable-operating direction D32 opposite to the first cable-operating direction D31.

The operating structure 23 further includes a restricting member 34 configured to restrict pivot movement of the first movable member 22 between the rest position P11 and the operated position P12. The restricting member 34 is attached to the base plate 18 of the base member 12 (FIG. 3). The first movable member 22 includes an elongated opening 22a extending in the first direction D1. The restricting member 34 extends through the elongated opening 22a. The first movable member 22 is positioned at the rest position P11 by the biasing member 32 and the restricting member 34. The first movable member 22 is pivotable relative to the base member 12 within a movable range defined by the elongated opening 22a and the restricting member 34 against the biasing force F1 of the biasing member 32.

Figure 6:
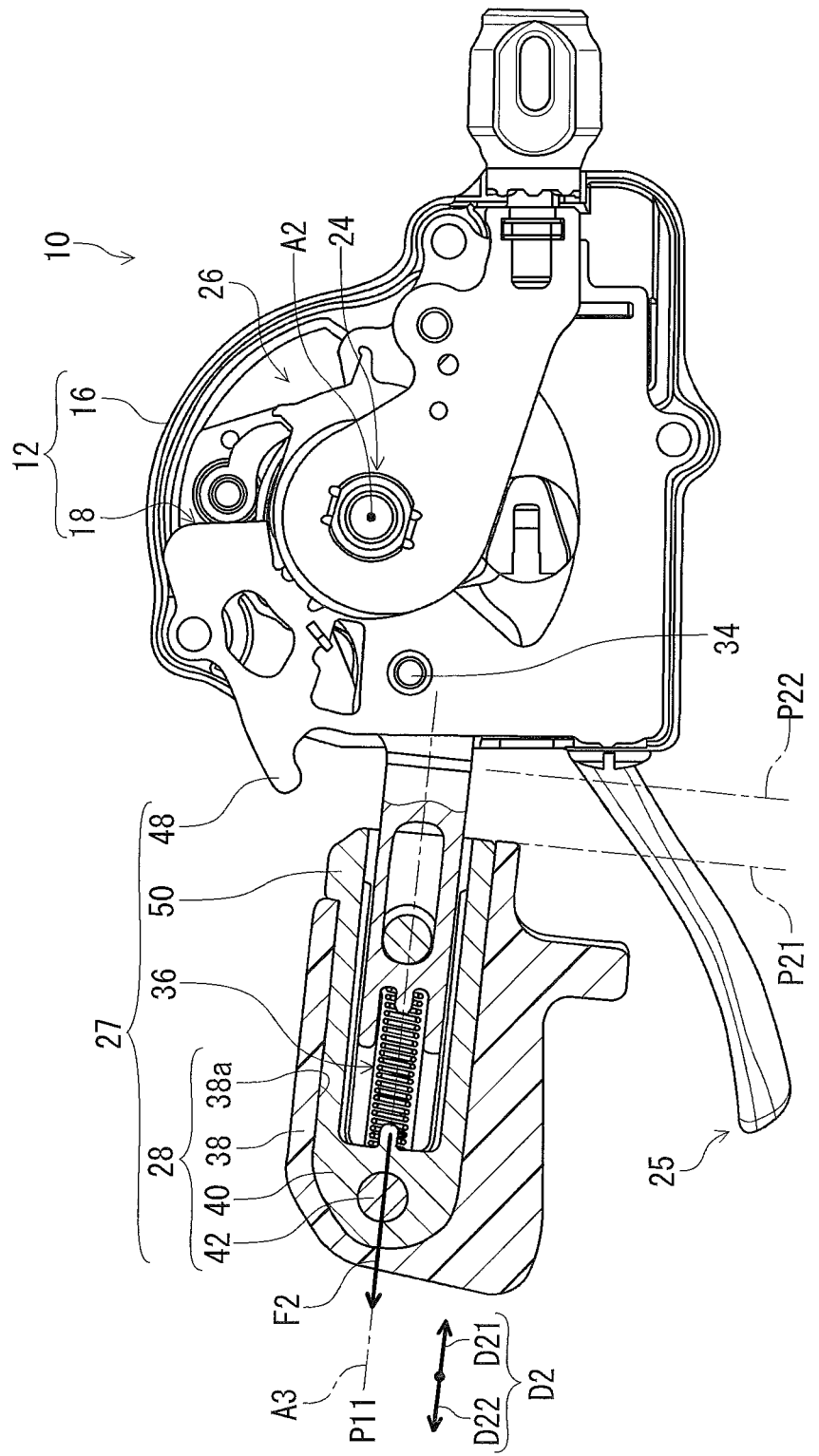
FIG. 6 is a cross-sectional view of the bicycle operating device illustrated in FIG. 1.

As seen in FIG. 6, the changing structure 27 further includes a biasing element 36 configured to bias the second movable member 28 to the first position P21 relative to the first movable member 22. The biasing element 36 is configured to radially outwardly bias the second movable member 28 relative to the first movable member 22. More specifically, the biasing element 36 is configured to bias the second movable member 28 toward an opposite side of the pivot axis A2 relative to the first movable member 22. The biasing element 36 is configured to bias the second movable member 28 in the second return direction D22. The biasing element 36 is configured to apply a biasing force F2 to the second movable member 28 along the longitudinal axis A3 of the first movable member 22.

The biasing element 36 is configured to bias the second movable member 28 toward the first handlebar end H1 (FIG. 2) of the bicycle handlebar H relative to the first movable member 22 in a state where the base member 12 is mounted to the bicycle handlebar H via the mounting member 20 at a position closer to the first handlebar end H1 than to the second handlebar end H2 (FIG. 2).

As seen in FIG. 6, the second movable member 28 includes a cover part 38, an insertion part 40, and a fastener 42. The cover part 38 has an internal cavity 38a. The insertion part 40 extends along the longitudinal axis A3 of the first movable member 22 and is provided in the internal cavity 38a. The biasing element 36 is provided in the internal cavity 38a.

Figure 7:
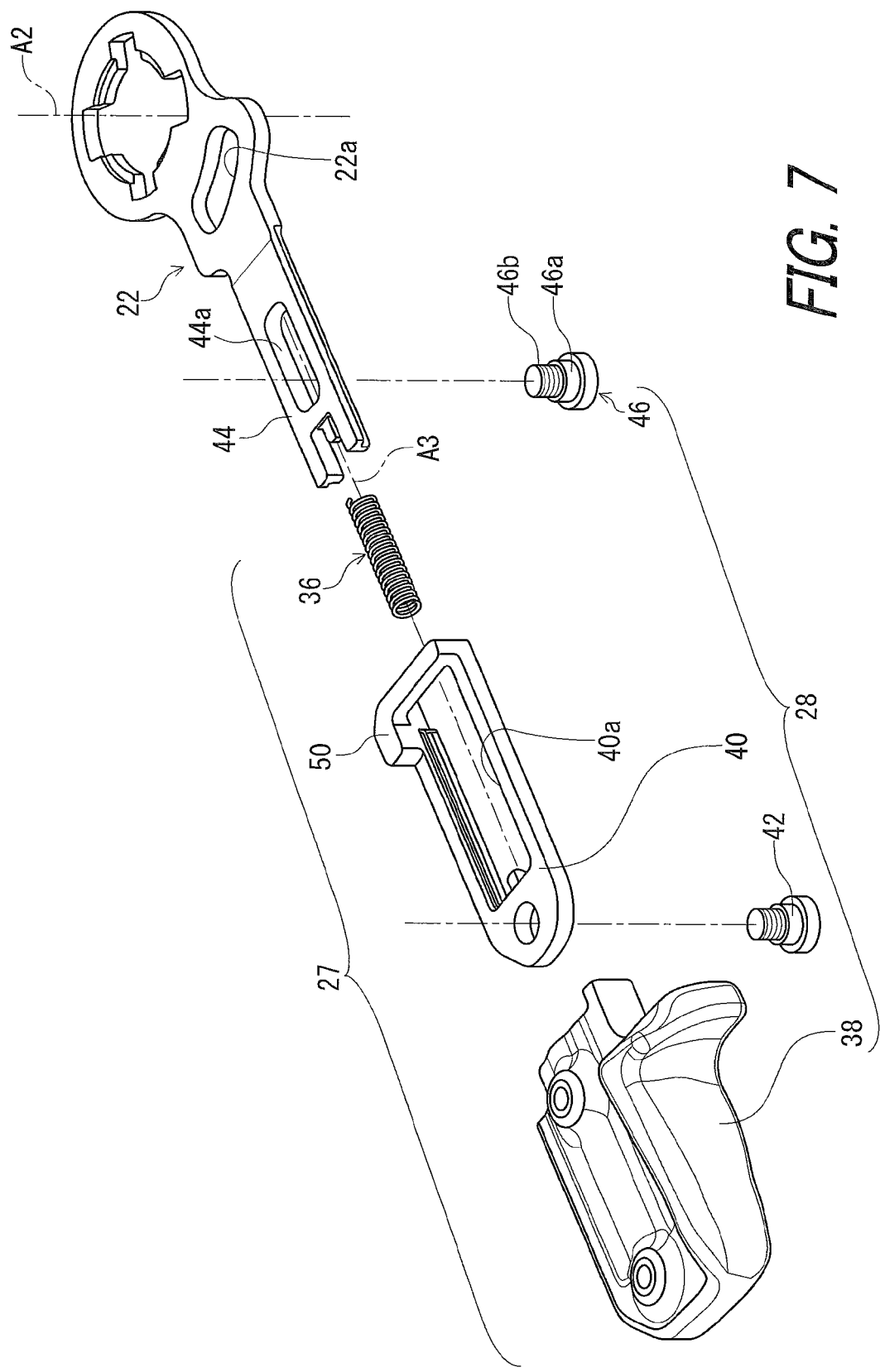
FIG. 7 is an exploded perspective view of a changing structure of the bicycle operating device illustrated in FIG. 1.

As seen in FIG. 7, the cover part 38 is fastened to the insertion part 40 by the fastener 42 (e.g., a screw). The insertion part 40 is slidable with the first movable member 22 along the longitudinal axis A3 of the first movable member 22. More specifically, the first movable member 22 includes a guide portion 44 extending along the longitudinal axis A3 of the first movable member 22. It can be said that the longitudinal axis A3 of the first movable member 22 is defined by the guide portion 44. The insertion part 40 includes a slide opening 40a extending along the longitudinal axis A3 of the first movable member 22. The guide portion 44 is slidably provided in the slide opening 40a to guide the second movable member 28 along the longitudinal axis A3 of the first movable member 22.

The first movable member 22 includes one of a contact part and an elongated hole. The second movable member 28 includes another of the contact part and the elongated hole. In the illustrated embodiment, the first movable member 22 includes an elongated hole 44a, and the second movable member 28 includes a contact part 46. The elongated hole 44a is provided on the guide portion 44 of the first movable member 22. The elongated hole 44a extends along the longitudinal axis A3 of the first movable member 22. The contact part 46 is provided in the elongated hole 44a so as to restrict relative movement between the first movable member 22 and the second movable member 28. The contact part 46 includes a contact body 46a and an externally threaded part 46b. The contact body 46a is movably provided in the elongated hole 44a. The externally threaded part 46b is screwed in a threaded hole (not shown) of the cover part 38.

As seen in FIG. 6, the changing structure 27 further includes a first contact portion 48 and a second contact portion 50. The first contact portion 48 is provided on the base member 12. The first contact portion 48 can, however, be provided on the first movable member 22. In the illustrated embodiment, the first contact portion 48 is integrally provided with the base plate 18 of the base member 12 as a single unitary member. The first contact portion 48 protrudes from the base member 12 to be contactable with the second contact portion 50. The second contact portion 50 is provided on one of the first movable member 22 and the second movable member 28. In the illustrated embodiment, the second contact portion 50 is provided on the second movable member 28. The second contact portion 50 is contactable with the first contact portion 48 to restrict an amount of movement of the first movable member 22 relative to the base member 12 when the second movable member 28 is positioned at the second position P22.

As seen in FIGS. 6 and 7, the second contact portion 50 is provided on the insertion part 40 of the second movable member 28. The second contact portion 50 is provided outside the cover part 38. In the illustrated embodiment, the cover part 38 is made of a non-metallic material such as a resin material. Each of the first contact portion 48 and the second contact portion 50 is made of a metallic material.

However, at least one of the first contact portion 48 and the second contact portion 50 can be made of a non-metallic material.

Figure 8:
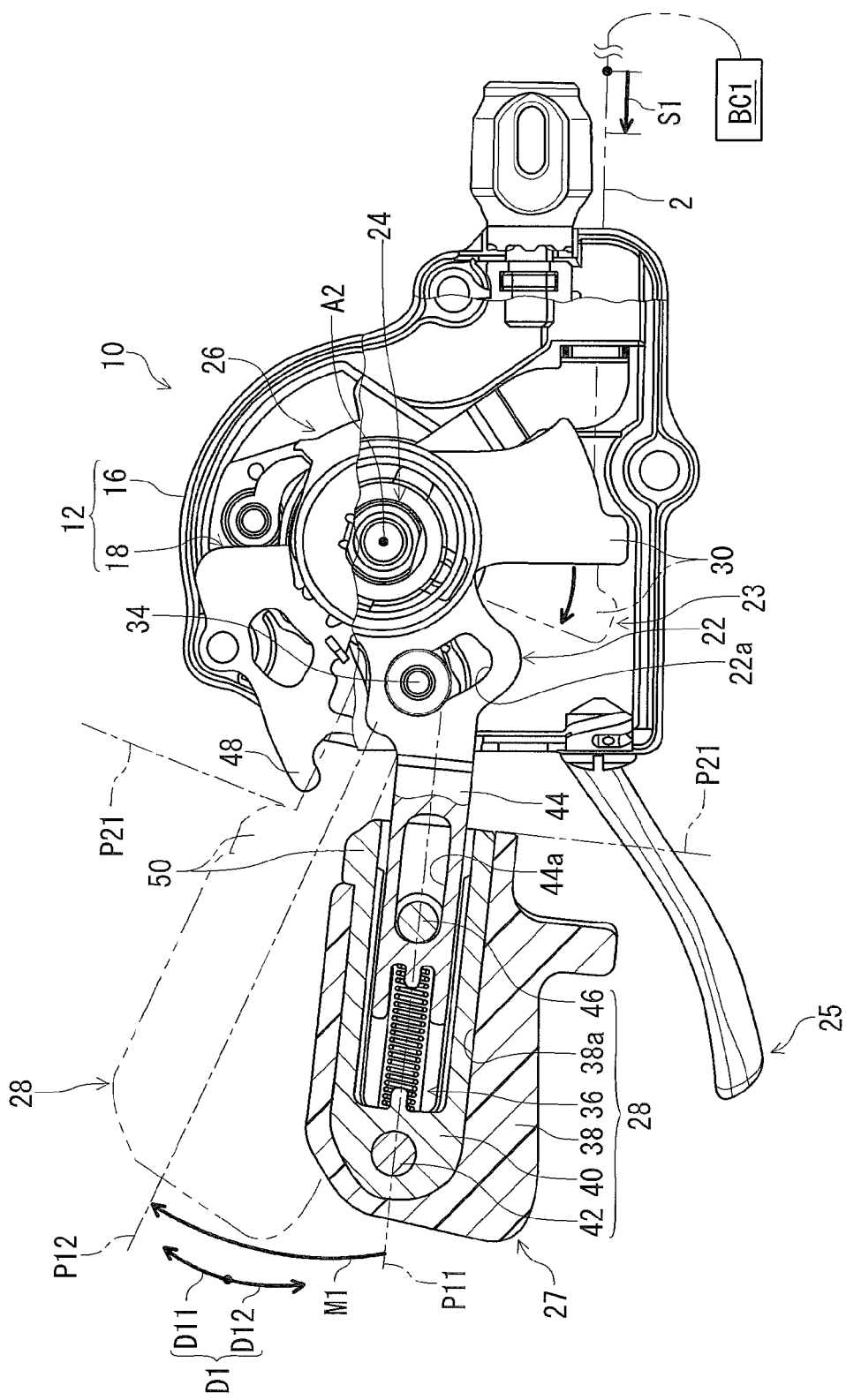
FIG. 8 is a cross-sectional view of the bicycle operating device illustrated in FIG. 1.

As seen in FIG. 8, the first position P21 corresponds to a first amount of movement M1 of the first movable member 22 relative to the base member 12. The first amount of movement M1 of the first movable member 22 is defined between the rest position P11 and the operated position P12. In a state where the second movable member 28 is positioned at the first position P21 relative to the first movable member 22, the second contact portion 50 is not contactable with the first contact portion 48. This allows the first movable member 22 to be pivoted relative to the base member 12 about the pivot axis A2 within the first amount of movement M1.

Figure 9:
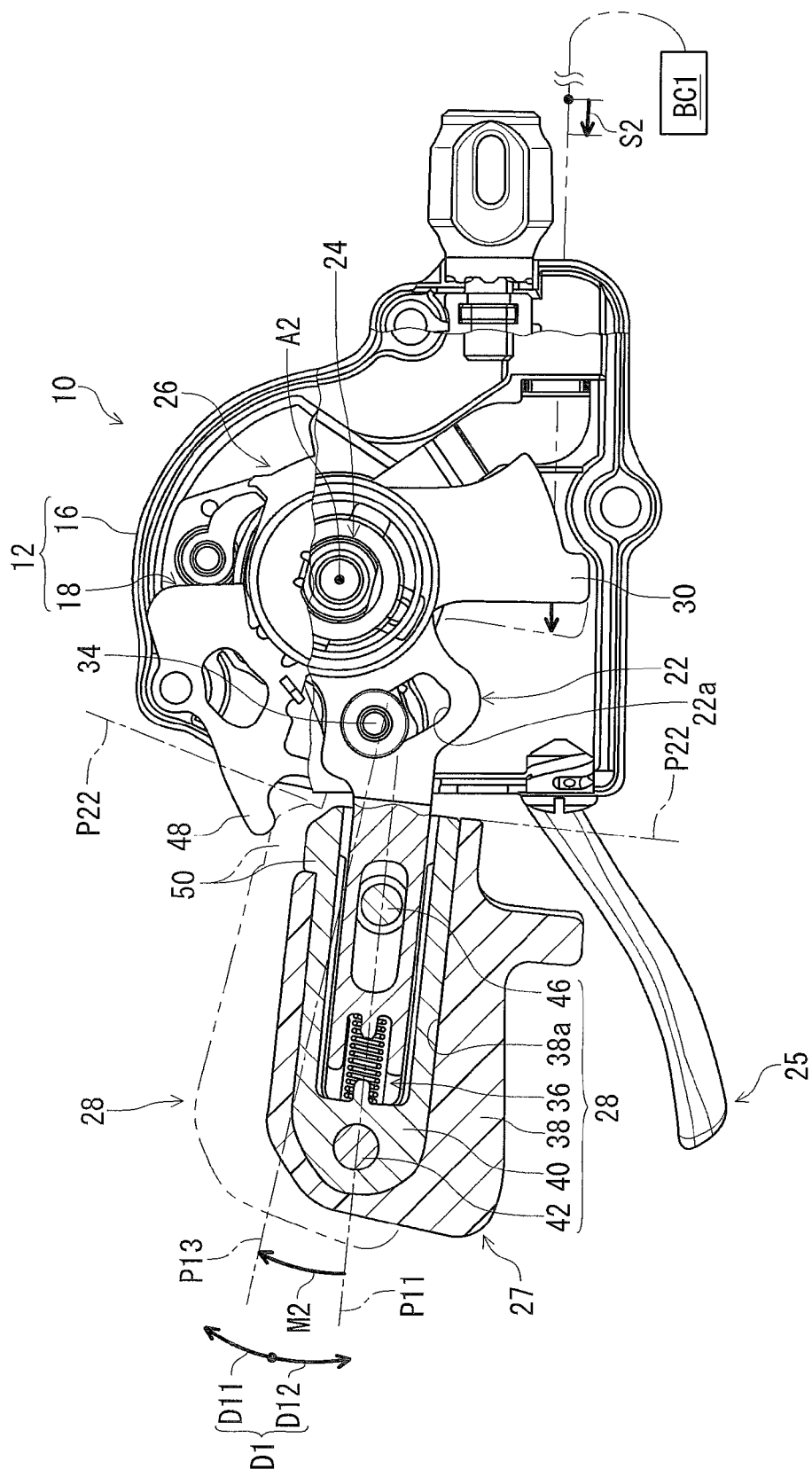
FIG. 9 is a cross-sectional view of the bicycle operating device illustrated in FIG. 1.

As seen in FIG. 9, the second position P22 corresponds to a second amount of movement M2 of the first movable member 22 relative to the base member 12. The second amount of movement M2 of the first movable member 22 is defined between the rest position P11 and an additional operated position P13. In a state where the second movable member 28 is positioned at the second position P22 relative to the first movable member 22, the second contact portion 50 is contactable with the first contact portion 48. In other words, the second movable member 28 positioned at the second position P22 is movable in the first operating direction D11 until the second contact portion 50 contacts with the first contact portion 48. This allows the first movable member 22 to be pivoted relative to the base member 12 about the pivot axis A2 within the second amount of movement M2.

As seen in FIGS. 8 and 9, the second amount of movement M2 is different from the first amount of movement M1. The first amount of movement M1 of the first movable member 22 is greater than the second amount of movement M2 of the first movable member 22. The bicycle operating device 10 differently operates the bicycle component BC1 when the first movable member 22 moves by the second amount of movement M2 in comparison with when the first movable member 22 moves by the first amount of movement M1.

For example, in a case where the bicycle component BC1 is a derailleur, the bicycle operating device 10 operates the derailleur so that a shift position of when the first movable member 22 moves by the second amount of movement M2 is different from a shift position of when the first movable member 22 moves by the first amount of movement M1. In a case where the bicycle component BC1 is a height adjustable seatpost assembly, the bicycle operating device 10 operates the height adjustable seatpost assembly so that height of when the first movable member 22 moves by the second amount of movement M2 is different from height of when the first movable member 22 moves by the first amount of movement M1.

More specifically, as seen in FIG. 8, the operating structure 23 is configured to pull the operation cable 2 by a first amount of cable stroke S1 in a state where the first movable member 22 is moved relative to the base member 12 by the first amount of movement M1. As seen in FIG. 9, the operating structure 23 is configured to pull the operation cable 2 by a second amount of cable stroke S2 in a state where the first movable member 22 is moved relative to the base member 12 by the second amount of movement M2. As seen in FIGS. 8 and 9, the first amount of cable stroke S1 is different from the second amount of cable stroke S2. The first amount of cable stroke S1 is greater than the second amount of cable stroke S2.

As described above, changing an amount of movement of the first movable member 22 by the changing structure 27 results in differently operating the bicycle component BC1 in comparison with a state before changing the amount of movement of the first movable member 22 by the changing structure 27.

With the bicycle operating device 10, the changing structure 27 includes the second movable member 28 configured to be movable relative to the first movable member 22, and the changing structure 27 is configured to change an amount of movement of the first movable member 22 relative to the base member 12 in accordance with movement of the second movable member 28 relative to the first movable member 22. Accordingly, the operation cable 2 can be pulled by each of the first amount of movement M1 and the second amount of movement M2 in response to operations of the first movable member 22 and the second movable member 28. This allows the structure of the bicycle operating device 10 to be simplified.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle operating device comprising:
 a base member configured to be mounted to a bicycle part;
 a first movable member movable relative to the base member, the first movable member being movable relative to the base member in a first direction, the first movable member being pivotably mounted to the base member in the first direction about a pivot axis, the first movable member having a longitudinal axis outwardly extending with respect to the pivot axis;

an operating structure configured to operate a bicycle component in response to movement of the first movable member; and a changing structure including a second movable member movable relative to the first movable member to change an amount of movement of the first movable member relative to the base member in accordance with movement of the second movable member relative to the first movable member, the second movable member being movable relative to the first movable member in a second direction different from the first direction, wherein the second movable member is movable between a first position and a second position, and the changing structure further includes a biasing element configured to bias the second movable member to the first position relative to the first movable member.

2. The bicycle operating device according to claim 1, wherein the operating structure is configured to operate the bicycle component by moving an operation cable relative to the base member in response to movement of the first movable member.

3. The bicycle operating device according to claim 2, wherein the operating structure is configured to pull the operation cable by a first amount of cable stroke in a state where the first movable member is moved relative to the base member by a first amount of movement, the operating structure is configured to pull the operation cable by a second amount of cable stroke in a state where the first movable member is moved relative to the base member by a second amount of movement, the second amount of movement being different from the first amount of movement, and the first amount of cable stroke is different from the second amount of cable stroke.

4. The bicycle operating device according to claim 3, wherein the first amount of movement of the first movable member is greater than the second amount of movement of the first movable member, and the first amount of cable stroke is greater than the second amount of cable stroke.

5. The bicycle operating device according to claim 1, wherein the first position corresponds to a first amount of movement of the first movable member relative to the base member, and the second position corresponds to a second amount of movement of the first movable member relative to the base member, the second amount of movement being different from the first amount of movement.

6. The bicycle operating device according to claim 5, wherein the changing structure further includes a first contact portion and a second contact portion, and the second contact portion is provided on one of the first movable member and the second movable member and is contactable with the first contact portion to restrict an amount of movement of the first movable member relative to the base member when the second movable member is positioned at the second position.

7. The bicycle operating device according to claim 6, wherein each of the first contact portion and the second contact portion is made of a metallic material.

8. The bicycle operating device according to claim 6, wherein the first contact portion protrudes from the base member to be contactable with the second contact portion.

9. The bicycle operating device according to claim 5, wherein the bicycle operating device differently operates the bicycle component when the first movable member moves by the second amount of movement in comparison with when the first movable member moves by the first amount of movement.

10. The bicycle operating device according to claim 1, wherein the second movable member is mounted to the first movable member.

11. The bicycle operating device according to claim 10, wherein the second movable member is slidable relative to the first movable member.

12. The bicycle operating device according to claim 1, wherein the second movable member is movable relative to the base member in the first direction together with the first movable member.

13. The bicycle operating device according to claim 1, further comprising:

a mounting member configured to detachably couple the base member to the bicycle part, wherein the first movable member extends along an additional longitudinal axis of the bicycle part in a state where the first movable member is positioned at a rest position and in a state where the base member is mounted to the bicycle part via the mounting member.

14. The bicycle operating device according to claim 13, wherein the bicycle part comprises a bicycle handlebar extending along the additional longitudinal axis, the bicycle handlebar includes a first handlebar end and a second handlebar end opposite to the first handlebar end, and the changing structure further includes a biasing element configured to bias the second movable member toward the first handlebar end of the bicycle handlebar relative to the first movable member in a state where the base member is mounted to the bicycle handlebar via the mounting member at a position closer to the first handlebar end than to the second handlebar end.

15. The bicycle operating device according to claim 1, wherein changing an amount of movement of the first movable member by the changing structure results in differently operating the bicycle component in comparison with a state before changing the amount of movement of the first movable member by the changing structure.

16. The bicycle operating device according to claim 1, wherein the first movable member is movable relative to the base member from a rest position to a plurality of positions each different from the rest position in accordance with the amount of movement of the first movable member changed by the changing structure.

17. The bicycle operating device according to claim 1, wherein
the changing structure is configured to change the amount of movement of the first movable member relative to the base member from a first amount of movement to a second amount of movement, wherein the first amount of movement extends between a rest position and a first position, wherein the second amount of movement extends between the rest position and a second position, and wherein the rest position, the first position, and the second position are different positions.

18. The bicycle operating device according to claim 1, wherein
the second movable member is movable between a first position and a second position relative to the first movable member,
a first distance is defined between the pivot axis and the second movable member in a state where the second movable member is positioned at the first position relative to the first movable member,
a second distance is defined between the pivot axis and the second movable member in a state where the second movable member is positioned at the second position relative to the first movable member, and
the first distance is longer than the second distance.

19. The bicycle operating device according to claim 1, wherein
the second movable member is movable between a first position and a second position relative to the first movable member,
the changing structure further includes a first contact portion and a second contact portion,
the second contact portion is provided on one of the first movable member and the second movable member,
the first contact portion is provided on the other of the first movable member and the second movable member,
the second contact portion is spaced apart from the first contact portion regardless of a position of the first movable member relative to the base member in a state where the second movable member is positioned at the first position relative to the first movable member, and
the second contact portion is contactable with the first contact portion in a state where the second movable member is positioned at the second position relative to the first movable member.

20. The bicycle operating device according to claim 19, wherein
the first movable member is pivotable relative to the base member about the pivot axis from a rest position to an operated position through an additional operated position defined between the rest position and the operated position,
the second contact portion is spaced apart from the first contact portion when the first movable member pivots relative to the base member about the pivot axis between the rest position and the operated position in the state where the second movable member is positioned at the first position relative to the first movable member, and
the second contact portion is in contact with the first contact portion in a state where the first movable member is positioned at the additional operated position relative to the base member and the second movable member is positioned at the second position relative to the first movable member.

21. The bicycle operating device according to claim 20, wherein
the second contact portion is spaced apart from the first contact portion in a state where the first movable member is positioned at the rest position relative to the base member and the second movable member is positioned at the second position relative to the first movable member.

22. A bicycle operating device comprising:
a base member configured to be mounted to a bicycle part;
a first movable member movable relative to the base member, the first movable member being movable relative to the base member in a first direction, the first movable member being pivotably mounted to the base member in the first direction about a pivot axis, the first movable member having a longitudinal axis outwardly extending with respect to the pivot axis;
an operating structure configured to operate a bicycle component in response to movement of the first movable member; and
a changing structure including a second movable member movable relative to the first movable member to change an amount of movement of the first movable member relative to the base member in accordance with movement of the second movable member relative to the first movable member, the second movable member being movable relative to the first movable member in a second direction different from the first direction, wherein
the changing structure further includes a biasing element configured to outwardly bias, with respect to the pivot axis, the second movable member relative to the first movable member.

23. The bicycle operating device according to claim 22, wherein
the first movable member includes one of a contact part and an elongated hole,
the second movable member includes another of the contact part and the elongated hole, and
the contact part is provided in the elongated hole so as to restrict relative movement between the first movable member and the second movable member.

24. A bicycle operating device comprising:
a base member configured to be mounted to a bicycle part;
a first movable member movable relative to the base member;
an operating structure configured to operate a bicycle component in response to movement of the first movable member; and
a changing structure including a second movable member movable relative to the first movable member to change an amount of movement of the first movable member relative to the base member in accordance with movement of the second movable member relative to the first movable member, the second movable member being movable between a first position and a second position, the first position corresponding to a first amount of movement of the first movable member relative to the base member, the second position corresponding to a second amount of movement of the first movable member relative to the base member, the second amount of movement being different from the first amount of movement,
the changing structure further including a first contact portion and a second contact portion, the second contact portion being provided on one of the first movable member and the second movable member and being contactable with the first contact portion to restrict an amount of movement of the first movable member relative to the base member when the first movable member moves relative to the base member in a first direction in a state where the second movable member is positioned at the second position.

25. The bicycle operating device according to claim 24, wherein the second contact portion comes into contact with the first contact portion when the first movable member moves relative to the base member in the first direction in the state where the second movable member is positioned at the second position, and the second contact portion comes into no contact with the first contact portion when the first movable member moves relative to the base member in a second direction different from the first direction in the state where the second movable member is positioned at the second position.

* * * * *